(12) United States Patent
Karam et al.

(10) Patent No.: US 9,082,164 B2
(45) Date of Patent: Jul. 14, 2015

(54) AUTOMATIC CELL MIGRATION AND PROLIFERATION ANALYSIS

(76) Inventors: Lina Jamil Karam, Scottsdale, AZ (US); Asaad Said, Tempe, AZ (US)

(*) Notice: Subject to any disclaimer, the term of this patent is extended or adjusted under 35 U.S.C. 154(b) by 984 days.

(21) Appl. No.: 12/419,294

(22) Filed: Apr. 6, 2009

(65) Prior Publication Data

US 2010/0080439 A1 Apr. 1, 2010

Related U.S. Application Data

(60) Provisional application No. 61/042,533, filed on Apr. 4, 2008.

(51) Int. Cl.
| G06K 9/48 | (2006.01) |
| G06T 7/00 | (2006.01) |
| G06K 9/00 | (2006.01) |
| G06T 7/40 | (2006.01) |

(52) U.S. Cl.
CPC ............ *G06T 7/0012* (2013.01); *G06K 9/0014* (2013.01); *G06K 9/00134* (2013.01); *G06T 7/0081* (2013.01); *G06T 7/401* (2013.01); *G06T 2207/20104* (2013.01); *G06T 2207/20161* (2013.01); *G06T 2207/30024* (2013.01)

(58) Field of Classification Search
CPC ........... G06T 2207/20104; G06T 2207/20161; G06T 2207/30024
USPC ......... 382/128, 133, 164, 173, 175, 178, 254, 382/199, 170, 225
See application file for complete search history.

(56) References Cited

U.S. PATENT DOCUMENTS

| 6,707,940 | B1* | 3/2004 | Qian .............................. 382/173 |
| 2003/0099389 | A1* | 5/2003 | Zeng et al. ..................... 382/131 |
| 2004/0184648 | A1* | 9/2004 | Zhang et al. ................... 382/141 |
| 2006/0072844 | A1* | 4/2006 | Wang et al. .................... 382/254 |
| 2006/0280352 | A1* | 12/2006 | Muschler et al. .............. 382/133 |
| 2007/0130165 | A1* | 6/2007 | Sjoblom et al. ................. 707/10 |
| 2007/0167779 | A1* | 7/2007 | Kim et al. ...................... 600/443 |
| 2008/0144895 | A1* | 6/2008 | Hunter et al. .................. 382/128 |

OTHER PUBLICATIONS

Cremers ("A Review of Statistical Approaches to Level Set Segmentation: Integrating Color, Texture, Motion and Shape" International Journal of Computer vol. 72(2), 195-215, 2007).*
Image Analysis Group ("Non-Linear Diffusion Filtering" Chalmers University of Technology, Autumn 2000).*

* cited by examiner

Primary Examiner — Marcos D. Pizarro
Assistant Examiner — Sue Tang (57) ABSTRACT

The disclosed methods and apparatus provide for the automatic segmentation and analysis of the overall migration rate and proliferation rate of cells that may be used with any resolution image and without the need to prepare the sample or the image before the image is analyzed. In particular embodiments, the method or apparatus of analyzing a cell image comprise performing a structure tensor analysis and/or regularization and/or a histogram-based analysis and/or a level-set analysis to classify pixels in the image into a region of interest (ROI), corresponding to cell clusters, and a non-significant region. Methods and apparatus for cell migration analysis comprise means for computing the areas of the segmented ROIs for a set of images. Methods and apparatus for cell proliferation analysis comprise means for counting the number of cells within the segmented ROIs for a set of images.

23 Claims, 9 Drawing Sheets

(a). original image    (b). Enhanced version of (a)

AUTOMATIC CELL MIGRATION AND PROLIFERATION ANALYSIS

CROSS-REFERENCE TO RELATED APPLICATION

This application claims the benefit of provisional patent application Ser. No. 61/042,533 filed on 2008 Apr. 4 by the present inventors.

BACKGROUND OF THE INVENTION

I. Field of the Invention

The present invention relates generally to the fields of biology and cellular image processing. In certain aspects, the invention is related to methods for cell segmentation and cellular image processing.

II. Description of Related Art

Studying the migration and proliferation behavior of cells contributes to the understanding of biological processes and disease pathologies such as cancer, angiogenesis, vascular stenosis and arthritis. To this end, cellular imaging coupled with image processing and segmentation techniques, has been used to provide an automatic and improved analysis of the cellular behavior.

Cell segmentation is one of the many challenging tasks in cellular image processing. Several methods have been proposed and developed for cell segmentation and tracking Kachouie and Fieguth (2005); Debeir et al. (2005); Espinoza et al. (2006); Bunyak et al. (2006); Li et al. (2006); Yang et al. (2005); Kachouie et al. (2005). In general, these methods work for specific cell types and under specific constraints. In Kachouie and Fieguth (2005), a gradient-based level-set method is used for cluster segmentation of neural stem cells. But the method of Kachouie and Fieguth (2005) is not robust in the presence of noise. Moreover, this method is not fully automatic as it requires the knowledge of the cell cluster location relative to the initial boundary of the evolving level-set function. In Debeir et al. (2005), a cell tracking scheme is presented, for in vitro phase contrast video microscopy, using a combination of mean shift processes. However, in the presented method Debeir et al. (2005), the user needs to manually select the locations of the cells in the first or the last frame of the video sequence. In addition, the original frames need to be pre-processed by performing contrast enhancement and illumination correction. In Espinoza et al. (2006), a cell cluster segmentation algorithm is presented based on global and local thresholding for In-SITU microscopic images. This method requires noise-free images, non-overlapping cells, and a high-contrast between cells and background. Also, many parameters need to be adjusted to compute the local threshold. In Bunyak et al. (2006), the level-set method of Vese and Chan (2002) is used, with one level-set function, for the segmentation and tracking of multiple motile epithelial cells during wound healing. In Li et al. (2006), a topology-constrained level-set method is presented to prevent the merging of touching and partially overlapping cells. Level-set methods were also used for cell segmentation and tracking in Yang et al. (2005). In Kachouie et al. (2005), a probabilistic model was proposed for the segmentation of hematopoietic stem cells; the proposed model is based on identifying the most probable cell locations in the image on the basis of cell brightness and morphology. The latter method is sensitive to cell overlap, cell shape, and the used threshold. Moreover, the methods of Li et al. (2006); Yang et al. (2005); Kachouie et al. (2005) require noise-free images with a good contrast between the cells and the background.

Asaad et al. (2007) presented a cell migration and cell counting scheme for bladder cancer cell images, where the segmentation is based on a piecewise level-set segmentation method. The goal was to automatically determine the overall cell migration rate, from a set of acquired bladder cancer cell images, by extracting and analyzing the evolution of the region where the cells cluster. This "cell cluster" region is denoted as the region of interest (ROI). A mathematical morphology process was used as the first step in the scheme of Asaad et al. (2007) to smooth and fill the gaps between individual cells inside the ROI. This step was needed before applying the piecewise level-set segmentation method. In the piecewise level-set segmentation methods, objects can be separated from the background based on different mean values of object and background. In some cases, these mean values are very close to each other, which causes the piecewise segmentation to fail in capturing the object (ROI). Moreover, if the image has artifacts, such as the ones shown in FIG. 4, FIG. 6, and FIG. 7 between the ROI and outer-circle, the piecewise method will segment the artifact area because it has a different mean than the background.

Lee et al. disclose a method for adaptive image region partition and morphologic processing in U.S. Pub. 2008/0037872. This method provides for partitioning an image into zones of influence (ZOI). However, this method is only applicable to high resolution images, and therefore has limited usefulness in cellular imaging.

Rimm et al. disclose a method for automated analysis of cells and tissues in U.S. Pub. 2008/0046190. This method provides for rapidly analyzing cell-containing samples, and employs biomarkers and stains to identify and analyze, for example, the location of subcellular compartments within individual cells. However, this method is also only applicable to high resolution images, and the samples must be prepared prior to the analysis of the image.

Bocking et al. disclose in U.S. Pub. 2008/0044849 a method to analyze cells, wherein the cells are adhesively applied to a slide and stained. In particular, the method includes treating the cells in any manner that alters the emission, transmission, and/or absorption behavior of the cells in relation to electromagnetic waves. Thus, this method involves the need to alter the sample prior to obtaining the image.

Vaisberg et al. (2006) disclose in U.S. Pat. No. 7,151,847 a method, code, and apparatus for analyzing cell images in order to automatically identify and characterize the Golgi complex in individual cells. The disclosed method, code, and apparatus of Vaisberg et al. does not deal with the segmentation of clusters of cells, but with identifying the Golgi complex within individual cells, which is not related to cell migration analysis.

There is therefore a need for a method for the automatic segmentation and analysis of the overall migration rate and proliferation rate of cells, that may be robust to noise and artifacts and that may be used with any resolution image and without the need to prepare the sample or the image before the image is analyzed. One way to overcome the disadvantages of the prior art is to consider the ROI area (cell cluster) as a texture region. This is based on the observation that the ROI region of the considered cancer cells has a high variance and a texture-like structure, such as grain, sands, and other textures, as compared to the other present artifacts and non-cell image features.

SUMMARY

According to some embodiments, a method or apparatus for analyzing and segmenting an image of cells, wherein the image can contain one or more cell clusters, which are referred to herein as the Region of Interests (ROI), comprises detecting image regions subsuming the cell clusters or regions corresponding to the ROI, and segmenting the ROI. In some embodiments, cell migration analysis comprises computing the area of the segmented ROI in the image at different points in time or in a sequence of images. In some embodiments, cell proliferation analysis comprises counting cells in the segmented ROI at different points in time or in a sequence of images.

In some embodiments, the analysis comprises a structure tensor analysis, morphological processing, and histogram-based thresholding. In one embodiment, the amplitude of the normalized structure tensor vector is used to detect high-activity or texture-like regions corresponding to the clusters of cells or ROIs. In another embodiment, the normalized structure tensor vector components are used for detecting the high-activity regions and in segmenting the ROIs. The morphological processing is used to regularize the detected texture-like or high-activity regions, followed by histogram-based thresholding to extract the ROIs. The histogram-based thresholding generates a binary mask, in which a value of 1 at a given image pixel indicates, for example, that the pixel corresponds to a location inside the ROI and a value of 0 indicates that a location corresponds to a location outside the ROI. The area of the ROI can be obtained by summing the number of obtained ones in the binary mask and scaling with the appropriate area unit corresponding to a pixel in the image. In the case of more than one cell cluster, labeling is applied to the resulting binary mask to separate the different clusters and the areas of the different clusters can be obtained by summing the different labels. The cell migration analysis is performed by analyzing the cell cluster areas at different points in time. In some embodiments, the cell proliferation analysis comprises a histogram-based counting procedure to count the number of cells in the segmented ROIs.

In other embodiments, the analysis comprises a structure tensor analysis, morphological processing, and a level-set based segmentation. In one embodiment, the amplitude of the structure tensor vector is used to detect high-activity or texture-like regions or ROIs. In another embodiment, the structure tensor vector components are used to detect the high-activity regions or ROIs. Morphological processing is used to regularize the detected regions, and level-set based segmentation is used to segment the ROIs. In one embodiment, the level-set based segmentation comprises a statistical-based level set segmentation. In another embodiment, the level-set based segmentation comprises a one-function level-set segmentation.

In particular embodiments, the analysis comprises a wavelet-based structure tensor analysis. In one embodiment, an undecimated wavelet decomposition is applied to the amplitude of the normalized structure tensor vector. In another embodiment, an undecimated wavelet decomposition is applied to each of the normalized structure tensor vector components. The low-low bands in the last level and before-last level of the undecimated wavelet decomposition are used to regularize the detected high-activity regions. In one embodiment, the wavelet-based structure tensor analysis is followed by a level-set based segmentation to segment the ROIs. In another embodiment, the wavelet-based structure tensor analysis is followed by a histogram-based thresholding to segment the ROIs.

In some embodiments, the analysis comprises a non-linear diffusion filter based structure tensor analysis. In one embodiment, the non-linear diffusion filter is applied to the amplitude of the normalized structure tensor vector. In another embodiment the diffusion filter is applied to the components of the normalized structure tensor vector. In one embodiment, the non-linear diffusion filter based structure tensor analysis is followed by a histogram-based thresholding to segment the ROIs. In another embodiment, the non-linear diffusion filter based structure tensor analysis is followed by a level-set based segmentation.

In other embodiments, the analysis comprises a level-set based segmentation. In one embodiment, the level-set based segmentation comprises a weighted level-set segmentation. In another embodiment, the level-set based segmentation comprises a two-step level-set segmentation.

It is contemplated that any method or apparatus described herein can be implemented with respect to any other method or apparatus described herein.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value.

Following long-standing patent law, the words "a" and "an," when used in conjunction with the word "comprising" in the claims or specifications, denote one or more, unless specifically noted.

Other objects, features and advantages will become apparent from the following detailed description. It should be understood, however, that the detailed description and the specific examples, while indicating specific embodiments of the invention, are given by way of illustration only, since various changes and modifications within the spirit and scope of the appended claims will become apparent to those skilled in the art from the detailed description.

BRIEF DESCRIPTION OF THE FIGURES

The following figures form part of the present specification and are included to further demonstrate certain aspects of the present embodiment. The embodiment may be better understood by reference to one or more of these figures in combination with the detailed description of specific embodiments presented herein.

FIG. 3A is the original image; FIG. 3B is the enhanced version of FIG. 3A; FIG. 3C is the level-set segmentation; FIG. 3D is the extracted region of interest (ROI); FIG. 3E is an enlarged part of the ROI; and FIG. 3F is the cell segmentation of FIG. 3E.

FIG. 6A is the original image; FIG. 6B is the enhanced version of FIG. 6A; FIG. 6C is the outer-circle segmentation; FIG. 6D is the structure tensor image ($I_x^2$, $I_y^2$, $2I_xI_y$); FIG. 6E is the intermediate segmentation stage of the current scheme; FIG. 6F is the final segmentation result of the current scheme; FIG. 6G is the intermediate segmentation stage for method of Said et al. (2007); FIG. 6H is the final segmentation result for method of Said et al. (2007).

FIG. 7A is the original image; FIG. 7B is the noisy image; FIG. 7C is the enhanced version of FIG. 7B; FIG. 7D is the intermediate segmentation stage 1 of the current scheme; FIG. 7E is the intermediate segmentation stage 2 of the current scheme; FIG. 7F is the final segmentation result of the current scheme; FIG. 7G is the intermediate segmentation stage 1 for method of Said et al. (2007); FIG. 7H is the intermediate segmentation stage 2 for method of Said et al. (2007); FIG. 7I is the final segmentation result of method of Said et al. (2007).

DESCRIPTION OF ILLUSTRATIVE EMBODIMENTS

Figure 1:
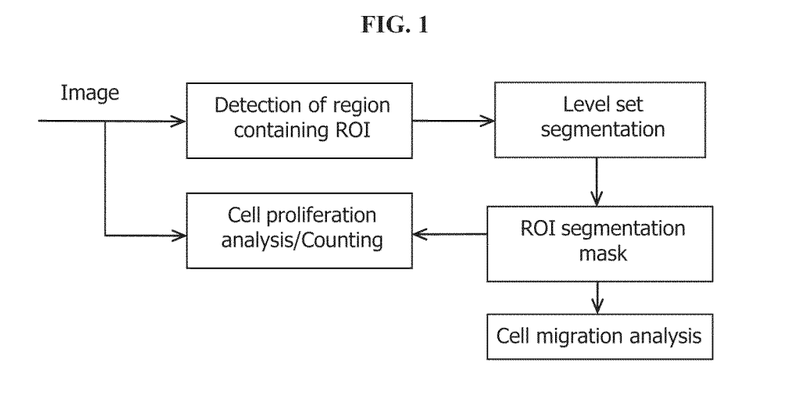
FIG. 1: Block diagram of CEA scheme.

A cell migration and proliferation analysis scheme, also called Cell Evolution Analysis (CEA) scheme, is presented for the automatic segmentation and analysis of the overall migration rate and proliferation behavior of cancer cells. A high-level block diagram of the CEA scheme is shown in FIG. 1. Example of cancer cells include but are not limited to bladder, glioblastoma, breast, pancreatic, to name a few. In contrast to existing cell segmentation and analysis methods, the proposed illustrative method performs well in the presence of noise; it also performs well for images with poor contrast and high cell concentrations, even when the cells are overlapping and small. The presented method was successfully applied on noisy and poor-contrast images of different bladder cancer cell lines interacting on different matrix substrates at two time points (16 and 40 hours). It was also tested successfully on glioblastoma cancer cells. The cells in these images are also very small in size and heavily concentrated within a portion of the image.

For illustrative purposes, we will consider cell images consisting of three regions as in the sample image in FIG. 3A: a dark region (black region in FIG. 3A and FIG. 3B), well region (gray region in FIG. 3A and FIG. 3B), and the cell cluster region, also called ROI, inside the well region. For visual clarity, an enhanced version of the image in FIG. 3A is also shown in FIG. 3B; however, only the non-enhanced original images are directly processed by the current CEA scheme. Images containing more than 3 regions such as images with several wells and cell clusters can also be successfully analyzed and the ROI can be successfully segmented by the disclosed embodiments. Also, images containing only two regions consisting, for example, of the well region and cell cluster can also be successfully analyzed and the ROI segmented using the disclosed embodiments.

Figure 4:
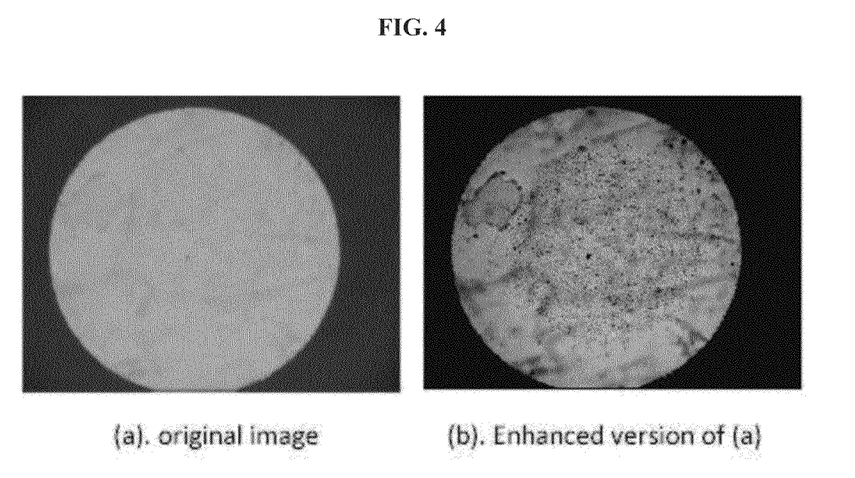
FIG. 4(A-B): An example of artifacts in a bladder cancer cell image.

The interest is in automatically determining the overall cell migration rate, from a set of acquired cancer cell images, by extracting and analyzing the evolution of the region where the cells cluster. This region is denoted as the region of interest (ROI). A sample low-contrast and noisy bladder cancer cell image is shown in FIG. 4A. The enhanced version of FIG. 4A is shown in FIG. 4B. As indicated previously, the considered images consist of three different regions as follows: 1) the ROI: cell clustering area, 2) outer-circle (bright area): the region between the ROI and dark area, and 3) the region outside the outer circle (dark area). Due to the present noise and artifacts as shown in FIG. 4(A-B), it will be hard to segment the ROI using classical segmentation techniques such as thresholding and the indicated prior art. An accurate and adequate segmentation method is desirable to capture the boundaries of the ROI area.

The method of the one embodiment presents a new automatic cell migration analysis scheme, which combines texture segmentation with a statistical level-set approach. The current method is shown to be more robust to artifacts and noise and leads to a more accurate segmentation and representation of the ROI contour as compared to existing methods. The current method is not restricted to bladder cancer cells, but can also be applied to other cell types.

The following examples are included to demonstrate preferred embodiments. It should be appreciated by those of skill in the art that the techniques disclosed in the examples which follow represent techniques discovered by the inventors to function well in practice, and thus can be considered to constitute preferred modes. However, those of skill in the art should, in light of the present disclosure, appreciate that many changes can be made in the specific embodiments which are disclosed and still obtain a like or similar result. Thus, the scope of the embodiments should be determined by the appended claims and their legal equivalents, rather than by the examples given.

EXAMPLE 1

Cell Evolution Analysis (CEA) Scheme

The cell evolution analysis (CEA) scheme of one embodiment consists of the following two main parts (FIG. 1):

1—Cell migration analysis—achieved by determining and segmenting the region where the cells are concentrated, and then tracking the evolution of the contour of that region over time. This cell cluster region is denoted as the region-of-interest (ROI).

2—Cell proliferation analysis—achieved by segmenting and counting the cells inside the ROI at different time points.

As shown in FIGS. 3A and 3B, the considered illustrative bladder cancer cell images consist, each, of three different regions: 1) the ROI, 2) the region between the ROI and the outer circle (bright area), and 3) the region outside the outer circle (dark area). An automatic segmentation method needs to be devised to distinguish between these three regions. For the level-set based segmentation methods, two level-set functions are needed for the considered images. The level-set method of Bunyak et al. (2006) is, consequently, not applicable.

Alternatively, when the scheme of Chen and Vese (2002) with two level-set functions is applied directly to these images, it only succeeds in capturing the contour of the outer circle, but fails to capture the contour of the ROI. This occurs because the considered ROI is not a piecewise constant area and contains many gaps between the cells.

In one embodiment, the CEA scheme proceeds as follows. For each image cell, a cell merging operation is first performed to fill the gaps between cells; this is done using a closing operation with a circular structural element. In addition, in the presence of noise, spatial smoothing is performed using an averaging filter. This is followed by a level-set-based segmentation technique that uses two level-set functions for extracting the ROI together with the outer circle contour. The resulting segmented image can include small regions because of the artifacts in the original image; these small regions can be easily discarded due to their small size relative to the ROI. The overall migration rate of the cells (Cell migration analysis block in FIG. 1) is determined by tracking the evolution of the ROI size at different times. The size and shape of the ROI in one image changes with time due to the duplication and migration of cells. From the segmented ROIs at two successive times $t_a$ and $t_b$, where $t_b > t_a$, the cell cluster migration rate can be computed as $MR=(A(t_b)-A(t_a))/(t_b-t_a)$, where $A(t_i)$ is the area inside the ROI at time $t_i$. The cell proliferation behavior (Cell proliferation analysis block in FIG. 1) is analyzed through a cell counting procedure that is applied to the extracted ROIs at different time points.

A. Level-Set-Based ROI Segmentation

Level-set methods provide powerful mathematical tools to solve many geometrical problems such as topological changes, and tracking the contour of objects. Two level-set based methods, the weighted level-set method and the two-step level-set method, are proposed for the ROI segmentation. Both methods gave similar segmentation results on the considered images; but the two-step level-set segmentation method converges more quickly.

1. Weighted Level-Set Method

This method is a modified version of the method with two level-set functions presented in Vese and Chan (2002). In this modified version, the following weighted energy function is minimized:

$$F_4(C, \Phi) = \lambda_1 \int_\Omega |u_0 - c_{11}|^2 H(\phi_1) H(\phi_2) \, dx\, dy + \\ \lambda_2 \int_\Omega |u_0 - c_{10}|^2 H(\phi_1)(1 - H(\phi_2)) \, dx\, dy + \\ \lambda_3 \int_\Omega |u_0 - c_{01}|^2 (1 - H(\phi_1)) H(\phi_2) \, dx\, dy + \\ \lambda_4 \int_\Omega |u_0 - c_{00}|^2 (1 - H(\phi_1))(1 - H(\phi_2)) \, dx\, dy + \\ v_1 \int_\Omega |\nabla H(\phi_1)| \, dx\, dy + v_2 \int_\Omega |\nabla H(\phi_2)| \, dx\, dy \quad (1)$$

where $\lambda$'s and $v$'s are constants, $u_0$ is the considered image, and $c_{11}, c_{10}, c_{01}, c_{00}$ are constants corresponding to the mean of the image $u_0$ in the regions $\{\phi_1 > 0, \phi_2 > 0\}$, $\{\phi_1 > 0, \phi_2 < 0\}$, $\{\phi_1 < 0, \phi_2 > 0\}$ and $\{\phi_1 < 0, \phi_2 < 0\}$, respectively, and where $\lambda_1 = \lambda_2 = \lambda_a$ and $\lambda_3 = \lambda_4 = 1$. $\phi_1$ and $\phi_2$ are the two level-set functions and these evolve based on minimizing the energy in equation (1) to segment the image $u_0$. In (1), $H(\phi)$ is the regularized heaviside function (see Said (2007) for more details) and $\nabla H(\phi)$ is the gradient of the regularized heaviside function, which corresponds to the regularized Dirac function $\delta_\epsilon(\phi)$ (see Said (2007) for more details). The method described in Vese and Chan (2002) (which corresponds to setting the weights $\lambda_i = 1$, $i = 1, 2, 3, 4$ in equation (1)) fails to segment the considered bladder cancer cell images even after performing the cell merging operation. Instead, the ROI is partitioned into different regions by $\phi_1$ and $\phi_2$. This is due to the fact that the ROI has different means instead of one constant mean, even after applying the cell merging operation. To overcome this problem, the current weighted level-set segmentation method forces only one level set function to evolve inside the ROI by setting the weights in equation (1) to $\lambda_1 = \lambda_2 \lambda_a$ and $\lambda_3 = \lambda_4 = 1$. Using these weight values, it can be easily shown that the evolutions of the level set functions $\phi_1$ and $\phi_2$ are given by:

$$\frac{\partial \phi_1}{\partial t} = \\ \delta_\epsilon(\phi_1)\{v_1 \nabla \cdot (\nabla \phi_1 / |\nabla \phi_1|) - (\lambda_a(u_0 - c_{11})^2 - (u_0 - c_{01})^2) H(\phi_2) - \\ (\lambda_a(u_0 - c_{10})^2 - (u_0 - c_{00})^2)(1 - H(\phi_2))\} \\ \frac{\partial \phi_2}{\partial t} = \delta_\epsilon(\phi_2)\{v_2 \nabla \cdot (\nabla \phi_2 / |\nabla \phi_2|) - \lambda_a((u_0 - c_{11})^2 - (u_0 - c_{10})^2) \\ H(\phi_1) - ((u_0 - c_{01})^2 - (u_0 - c_{00})^2)(1 - H(\phi_1))\} \quad (2)$$

In equation (2), when choosing $\lambda_a > 1$, more weight is given for the region inside $\phi_1$ ($\phi_1 > 0$) to evolve inside $\phi_2$ ($\phi_2 > 0$). In this way, after few iterations, $\phi_1$ starts to evolve inside $\phi_2$ to capture the ROI, while $\phi_2$ evolves to capture the outer-circle. This method was successfully used to segment the ROI region in the considered cell bladder cancer images.

2. Two-Step Level-Set Method

The level-set method of Gao and Bui (2005) is adopted and applied to the considered bladder cancer cell images after the cell merging operation. This method applies $\phi_1$ and $\phi_2$, consecutively, rather than simultaneously. This process ensures that $\phi_1$ and $\phi_2$ are completely decoupled. This method proceeds in two steps as follows:

Step 1—Evolve one level-set function $\phi_1$ to segment the outer-circle using:

$$\frac{\partial \phi_1}{\partial t} = \delta_\epsilon(\phi_1)\{v_1 \nabla \cdot (\nabla \phi_1 / |\nabla \phi_1|) - (u_0 - c_1^I)^2 + (u_0 - c_2^I)^2\} \quad (3)$$

where $C_1^I$ and $C_2^I$ are the averages of $u_0$ inside and outside $\phi_2$ respectively.

The outer-circle is the region inside $\phi_1$ ($\phi_1 > 0$).

Step 2—Evolve level-set function $\phi_2$ inside $\phi_1$ ($\phi_1 > 0$) to segment the ROI using:

$$\frac{\partial \phi_2}{\partial t} = \delta_\epsilon(\phi_2)\{v_2 \nabla \cdot (\nabla \phi_2 / |\nabla \phi_2|) - \lambda_1(u_0 - c_1^{II})^2 + \lambda_2(u_0 - c_2^{II})^2\} \quad (4)$$

where $C_1^{II}$ and $C_2^{II}$ are the averages of $u_0$ inside and outside $\phi_2$ respectively, when $\phi_1 > 0$. In equation (4), the values of $\lambda_1$ and $\lambda_2$ affect the evolution rate of $\phi_2$ (Gao and Bui, 2005). In the evolution equations (3) and (4), $\delta_\epsilon(\phi)$ is the regularized Dirac function and $\nabla \cdot (\nabla \phi/|\nabla \phi|)$ is the curvature (see Said (2007) for more details).

The advantages of this two-step level-set method, as compared to the weighted level-set method, include a faster speed of convergence, lower computational complexity, and insensitivity to the initial conditions. For each step, the level-set function evolution is stopped when the absolute difference between the current and previous level-set function is less than a certain threshold.

B. Cell Segmentation and Counting

Cell counting is used in cell tracking and cell proliferation analysis. In the considered images, the cell population inside the ROI is in the range of 1,000-8,000 cells/image. Due to a large number of images and cells, manual counting of cells by humans has proven to be impractical, non-reliable, and exhaustive. So, an automatic reliable counting scheme is critical for speed and accuracy. Several automatic or semiautomatic methods have been proposed to segment the boundaries of the cells, and then count them. In Olivo-Marin (2002), an á trous wavelet transform is used to detect spots in the presence of noise. But this method works under certain assumptions such as a smooth background, a good contrast between cells and background, and disconnected cells. In Jeong et al. (2005), a comparison is presented for seven thresholding methods for breast tumor cell segmentation, and it was found that Otsu's method performed best. Otsu's method, however, does not give satisfactory results if the image contrast is low. Most of the existing methods fail to segment or count the cells if these are connected. In Li et al. (2006), the images have a high contrast between the cells and background, and cell populations are in the range 350-750 cells/image, which is significantly lower than the cell density in the bladder cancer cell images considered in this work. The main challenges with the given bladder cancer cell images are: heavily populated (high cell density), tiny cells, touching and overlapping cells, presence of noise in the images, and very low contrast as the intensity values of cell boundaries and background are very close. From FIG. 3E, it can be noticed that the centroid (nucleus) of the cell has a lower intensity than the cell boundary (halo). Consequently, the current strategy is to count the centroids of the cells instead of counting based on the cell boundary (Debeir et al., 2005); in this way, connected and overlapping cells may also be separated by their centroids as long as the centroids are separated. The current cell segmentation and counting procedure can be summarized as follows:

1. Using the segmentation masks of the outer-circle and of the ROI, which are obtained as described previously or using other embodiments, the histogram, mean, and variance of the background and of the ROI are computed. The background here is the region between the ROI and the outer-circle.

2. From the mean and variance of the background and the ROI, a threshold is computed and used to classify the ROI into significant (cells' centroids) and non-significant regions.

3. The resulting connected significant regions are counted using a labeling procedure.

Figure 2:
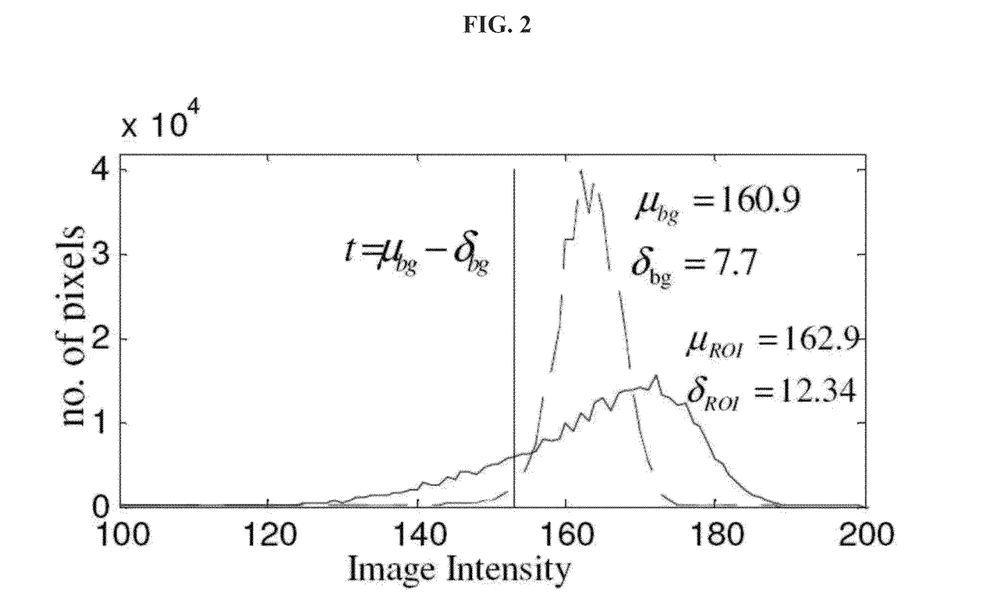
FIG. 2: Histogram of Background (dashed) and ROI (solid); μ; δ; and t denote the mean, standard deviation, and threshold, respectively.

The histogram distributions of the background (dashed curve) and ROI (solid curve) are shown in FIG. 2 for one of the considered images. It can be seen that the background and the ROI are close in mean. However, the background has a small variance as compared to the variance of the ROI. The increase of the variance, inside the ROI, is due to the large population of cells and the intensity variations between the centroid and the surface of the cell. Because the nonsignificant regions in the ROI (ROI pixels that do not correspond to a cell's centroid) have intensities similar to the background region (region between ROI and outer circle) and because the background has a relatively low variance, a threshold can be computed based on the mean and standard deviation of the background to segment the cells' centroids (significant ROI regions) from the non-significant ROI background-like regions (Debeir et al., 2005). The classification threshold is computed as $t_{=\mu bg}-\delta_{bg}$, where $\mu_{bg}$ and $\delta_{bg}$ represent the mean and standard deviation of the background, respectively. A pixel in the ROI is classified as significant (as belonging to a cell's centroid) if its intensity is less than the threshold t; otherwise, it is classified as non-significant. A labeling process is then applied to count the obtained cell centroids.

C. Results

Figure 3:
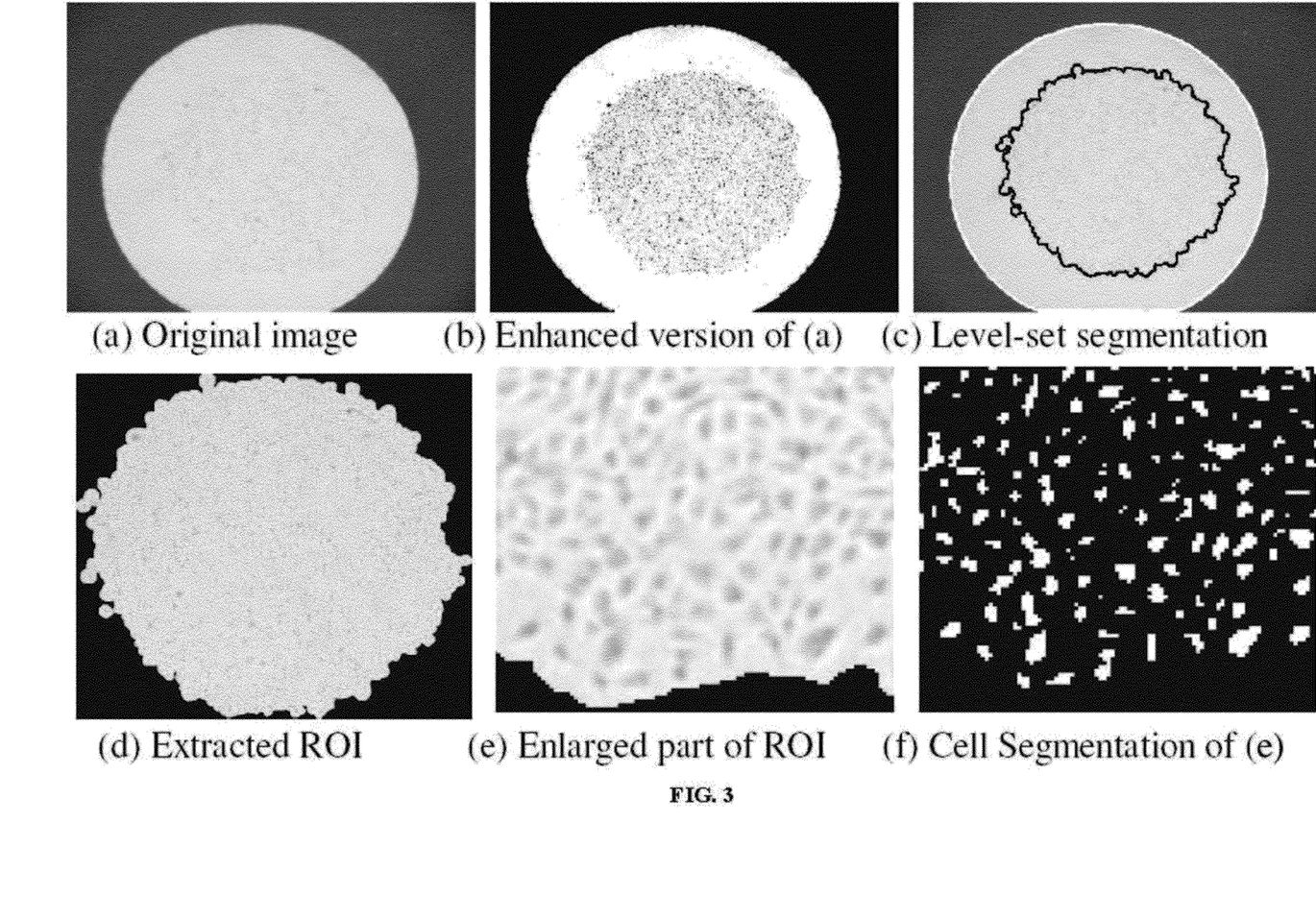
FIGS. 3(A-F): ROI and cell segmentation results using CEA scheme.

The current CEA scheme has been successfully tested using 120 bladder cancer cell images of size 1030×1300 and 4.926 μm² per pixel (60 different images at two different time points 16 and 40 hours). FIG. 3 shows the results obtained using one of the images at 40 hours. The original input image is shown in FIG. 3A. It can be seen that it is hard to clearly distinguish the cells from the background due to their small size and the low contrast. For illustration and visual clarity, an enhanced version of FIG. 3A is shown in FIG. 3B, although the current scheme is applied directly on the original low-contrast and non-enhanced image (FIG. 3A). The ROI segmentation result is shown in FIG. 3C (white contour for outer-circle, and the black contour for the ROI). The number of iterations needed to segment the outercircle is 3-4 iterations by using equation (3), and 4-6 iterations to segment the ROI by using equation (4). In comparison, the weighted level-set method requires at least 20 iterations to segment the outer-circle and the ROI by using equation (2). The resulting segmented ROI and an enlarged portion of the ROI are shown in FIGS. 3D and 3E, respectively. From FIG. 3E, it can be seen that the ROI contains touching and overlapping cells with a low contrast between the cells and their surround. Despite the low contrast and cell overlap, the current automatic thresholding procedure is able to successfully separate the cells for counting by segmenting their centroids as shown in FIG. 3F. The obtained counted number of cells inside the ROI is 7,073 for the considered image. To test the accuracy of the current counting method, several subjects were asked to manually count the cells in selected ROI sub-images with different cell concentrations; the average count was then computed for each considered ROI sub-image and compared to the count obtained using the current counting scheme. It was found that the current counting method achieves an accuracy of 97% on average. The compound ROI area is 699,206 μm² and 1,863,875 μm² at 16 and 40 hours, respectively, resulting in a migration rate of 48,528 μm²/hour.

EXAMPLE 2

Cell Migration Analysis Using a Structure Tensor Feature Space

A. Cell Migration Analysis Scheme

The overall migration analysis is done by segmenting and tracking the ROI (Cell cluster) area at different time instances. Given two extracted ROI areas, $A_{r1}$ and $A_{r2}$, ($t_2 > t_1$), the overall cell migration is given by $(A_{r2}-A_{r1})/(t_2-t_1)$.

The procedure starts by extracting the outer-circle using piecewise level-set segmentation (Vese and Chan, 2002) with one level-set function or using a histogram-based thresholding procedure. Then, the ROI is extracted by using an unsupervised texture segmentation procedure. This procedure consists of computing structure tensor features. These features can either be, for example, the components of a structure tensor vector that is computed at each pixel in the image, or can the amplitude of the structure tensor vector at each image pixel. The obtained structure tensor based image is then regularized. This regularization can be performed for example by means of a morphological closing operation or using an undecimated wavelet-decomposition or by using a non-linear diffusion filter (Perona and Malik, 1990). Using the regularized structure tensor based image, the ROI (cell cluster) can be segmented by performing a histogram-based thresholding or by applying a level-set based segmentation, such as a statistical level-set based segmentation.

Figure 5:
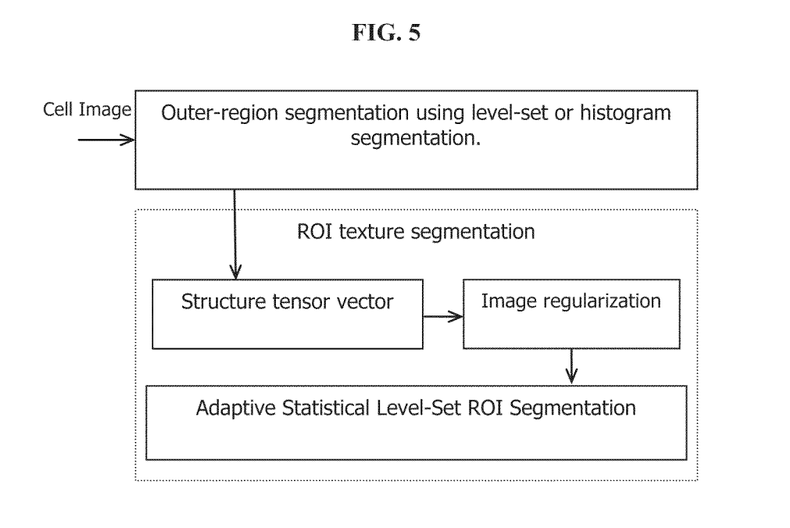
FIG. 5: Block diagram of Cell Migration Analysis.

A block diagram of one of the embodiments for ROI segmentation using a wavelet-based structure tensor analysis, where an undecimated wavelet decomposition is used for the regularization, and a statistical level-set segmentation is shown in FIG. 5. The employed statistical level-set method is based on a Bayesian formulation as in Rousson et al. (2003) and Cremers et al. (2007) and is able to differentiate between objects and background based not only on their mean values but also on their variances. The method of Rousson et al. (2003) augments the structure tensor data by adding it to the original grayscale image data, which would then fail to segment the ROI. In our case, only the structure tensor vector or its amplitude is used because these define well the structure of the ROI region for the considered cell images. In fact, it was found that, for the considered application, augmenting the structure tensor with the original grayscale image as in Rousson et al. (2003) not only increases the computational requirements without significant improvements but can also lead to incorrect segmentation results. More details about the current outer-circle segmentation, structure tensor computation, wavelet-based á trous filtering, and the adopted statistical level-set segmentation method are given below.

A. Outer-Circle Segmentation

The outer-circle is segmented using a piecewise level-set segmentation procedure (Vese and Chan, 2002) with one level set function $\phi_1$, where $\phi_1$ evolves as follows:

$$\frac{\partial \phi_1}{\partial t} = \delta(\phi_1)\left\{v_1 div\left(\frac{\nabla \phi_1}{|\nabla \phi_1|}\right) - (I - c_1^I)^2 + (I - c_2^I)^2\right\} \quad (1)$$

where $C_1^I$ and $C_2^I$ are the averages of the input image I inside ($\phi_1>0$) and outside $\phi_1$ ($\phi_1<0$), respectively. This step takes 3 to 6 iterations to segment the outer-circle regions inside $\phi_1$ ($\phi_1>0$).

B. Structure Tensor

The structure tensor is used to effectively represent the texture-like structure of the ROI. The structure tensor features are computed from the gradient of the image I as follows (Rousson et al., 2003; Bigun et al., 1991):

$$G = \nabla I \nabla I^T = \begin{bmatrix} I_x \\ I_y \end{bmatrix}[I_x \ I_y] = \begin{bmatrix} I_x^2 & I_x I_y \\ I_x I_y & I_y^2 \end{bmatrix} \quad (2)$$

where $I_x$ and $I_y$ represent the derivatives of I in the directions of x and y respectively. The structure tensor vector $\hat{u}=(u_1, u_2, u_3)$ can be represented using $I_x$ and $I_y$ as follows:

$$\hat{u}=(I_x^2, I_y^2, 2I_x I_y) \quad (3)$$

where the fact 2 is used because $I_x I_y$ appears twice in equation (2). Each component $u_i$ (i=1, 2, 3) of $\hat{u}(x,y)$ is then processed separately using an á trous wavelet filter before applying the statistical level-set segmentation on the structure tensor vector ú as described below.

C. Á Trous Wavelet Filtering

Before applying level-set segmentation, the three image components $u_i$ (i=1, 2, 3) of the structure tensor vector equation (3) have to be smoothed while preserving the edges. This regularization step is important and can significantly influence the segmentation results. In the current scheme, the undecimated wavelet transform is adopted for this regularization and is implemented using fast á trous filtering (Starck et al., 1995). The adopted á trous wavelet transform has many nice properties including translation-invariant, efficient implementation, and high correlation among the wavelet coefficients across scales. Moreover, it satisfies the Lipschitz regularity property (Mallat and Hwang, 1992), which can be exploited for differentiating between strong edges and noise or weak-edge singularities. Based on the Lipschitz property, noise and weak edges diminishes at a much faster rate than stronger edges as the scale increases. These properties are exploited in the current wavelet-based regularization procedure which can smooth variations, including weak edges, texture, and noise, while preserving the strong edges.

The á trous wavelet is implemented using separable filtering with an impulse response h=[1/16, 1/4, 3/8, 1/4, 1/16] for the row-wise and column-wise 1-D filters. Let $A_0(x,y)=u_i$ (i=1, 2, 3) represents the input structure tensor image component. The output approximation image at the first level after applying a separable convolution is $A_1(x,y)$, and the detail image is given by $D_1(x,y)=A_0(x,y)-A_1(x,y)$. Similarly, one can get $A_2(x,y)$ and $D_2(x,y)$ from $A_1(x,y)$ for the second level. In general, for any level j ($1 \leq j \leq L$), $A_j(x,y)$ and $D_j(x,y)$ can be computed as follows:

$$A_j(x,y)=\Sigma_l h(l) \Sigma_k h(k) A_{j-1}(x-2^{j-1}k, y-2^{j-1}l)$$

$$D_j(x,y)=I_{j-1}(x,y)-I_j(x,y) \quad (4)$$

Exploiting the shift invariance property and the high correlation among the resulting wavelet coefficients at different levels, for each structure tensor image component $u_i$ (i=1, 2, 3), a new image $\Psi_i(x,y)$ can be constructed through a pointwise multiscale multiplication as follows:

$$\Psi_i(x,y) = \Pi_{j=j_a}^{j_b} A_j(x,y), \ 1 \leq j_a \leq j_b \leq L. \quad (5)$$

where $A_j(x,y)$ is normalized by the norm of the gradient of the input structure tensor image $u_i$. The resulting wavelet-filtered structure tensor vector $\Psi=(\Psi_1, \Psi_2, \Psi_3)$ consists of smooth areas within the same texture classes while the edges are preserved among different texture classes. In the implementation, $j_a$ and $j_b$ in equation (5) were set to 3 and 4, respectively.

D. Adaptive Statistical Level-Set Segmentation

The adaptive statistical level-set segmentation method of Rousson et al. (2003) is adopted and is applied to segment the generated structure tensor $\hat{\Psi}$. In the considered bladder cancer cell images, one level set function ($\phi_2$) is required to segment the ROI and is evolved inside the already-segmented outer-circle area ($\phi_1>0$). The energy function and curve evolution equations for the ROI texture segmentation are given by $$E(\phi_2) = \int_\Omega \left(v_2|\nabla H(\phi_2)| + \sum_{j=1}^{3} \log p_2(\Psi_j(x,y)) + \sum_{j=1}^{3} \log \frac{p_1(\Psi_j(x,y))}{p_2(\Psi_j(x,y))} H(\phi_2)\right) dxdy \quad (6)$$

and $$\frac{\partial \phi_2}{\partial t} = \delta(\phi_2)\left(v_2 div\left(\frac{\nabla \phi_2}{|\nabla \phi_2|}\right) + \sum_{j=1}^{3} \log \frac{p_1(\Psi_j)}{p_2(\Psi_j)}\right) \quad (7)$$

where $\Psi_j$ is the $j^{th}$ component of the structure tensor $\hat{\Psi}$, and $p_i(\Psi_j)$ is the conditional probability density function of $\Psi_j$ given a region i (i=1, 2), with i=1 corresponding to the ROI ($\phi_2>0$) and i=2 corresponding to the region outside the ROI ($\phi_2<0$), $p_i(\Psi_j)$ is given by the following Gaussian approximation:

$$p_i(\Psi_j(x,y)) = (1/\sqrt{2\pi\sigma_{ij}^2}) e^{-(\Psi_j(x,y)-\mu_{ij})^2/2\sigma_{ij}^2} \quad (8)$$

where $u_{ij}$ and $\sigma_{ij}^2$ in Asaad et al. (2007) represent the mean and variance of the structure tensor image component $\Psi_j(x,y)$ in region i (i=1, 2), and can be represented by:

$$\mu_{1j} = \frac{\int_\Omega \Psi_j(x, y) H(\phi_2) dx dy}{\int_\Omega H(\phi_2) dx dy},$$

$$\sigma_{1j}^2 = \frac{\int_\Omega (\Psi_j(x, y) - \mu_{1j})^2 H(\phi_2) dx dy}{\int_\Omega H(\phi_2) dx dy},$$

$$\mu_{2j} = \frac{\int_\Omega \Psi_j(x, y)(1 - H(\phi_2)) dx dy}{\int_\Omega (1 - H(\phi_2)) dx dy},$$

and $$\mu_{2j}^2 = \frac{\int_\Omega (\Psi_j(x, y) - \mu_{2j})^2 (1 - H(\phi_2)) dx dy}{\int_\Omega (1 - H(\phi_2)) dx dy}.$$

B. Results

Figure 6:
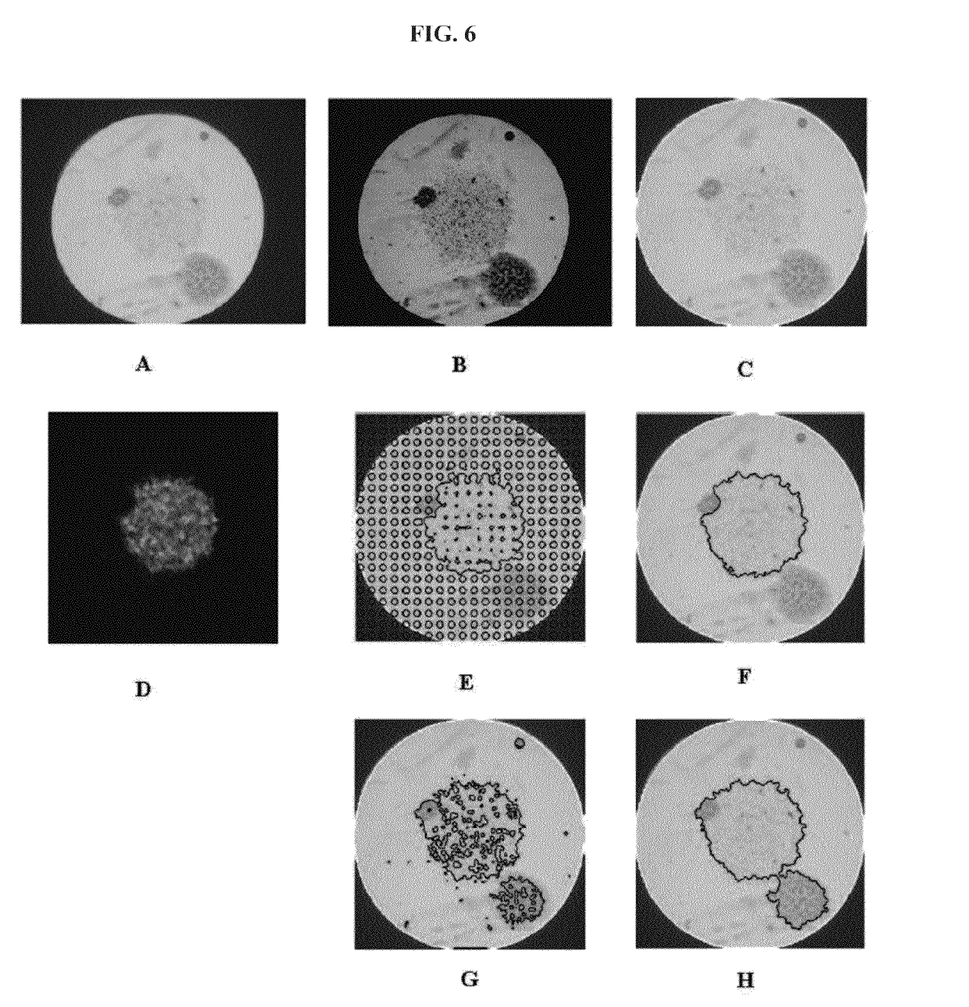
FIGS. 6(A-H): Comparing between the CEA scheme and the method of Asaad et al. (2007) in case of an input bladder cancer cell image with many artifacts.

The current scheme has been successfully tested using a set of low-contrast and noisy bladder cancer cell images of size 1100×1300. FIG. 6 shows the ROI segmentation results for a sample bladder cancer cell image. FIG. 6A shows the original input image which exhibits low contrast in addition to artifacts in the form of large gray sots. For illustration and visual clarity, an enhanced version of FIG. 6A is shown in FIG. 6B, although the current scheme is applied directly on the original low-contrast and non-enhanced image (FIG. 6A). The segmented outer-circle and the computed structure tensor are shown in FIGS. 6C and 6D, respectively. FIGS. 6E and 6F show the intermediate segmentation stage and the final segmented ROI, respectively using the current scheme. For comparison, the intermediate segmentation stage and the resulting segmented ROI using the method of Asaad et al. (2007) fails to segment the true ROI due to the present artifacts, while the current scheme results in an accurate segmentation of the ROI.

Figure 7:
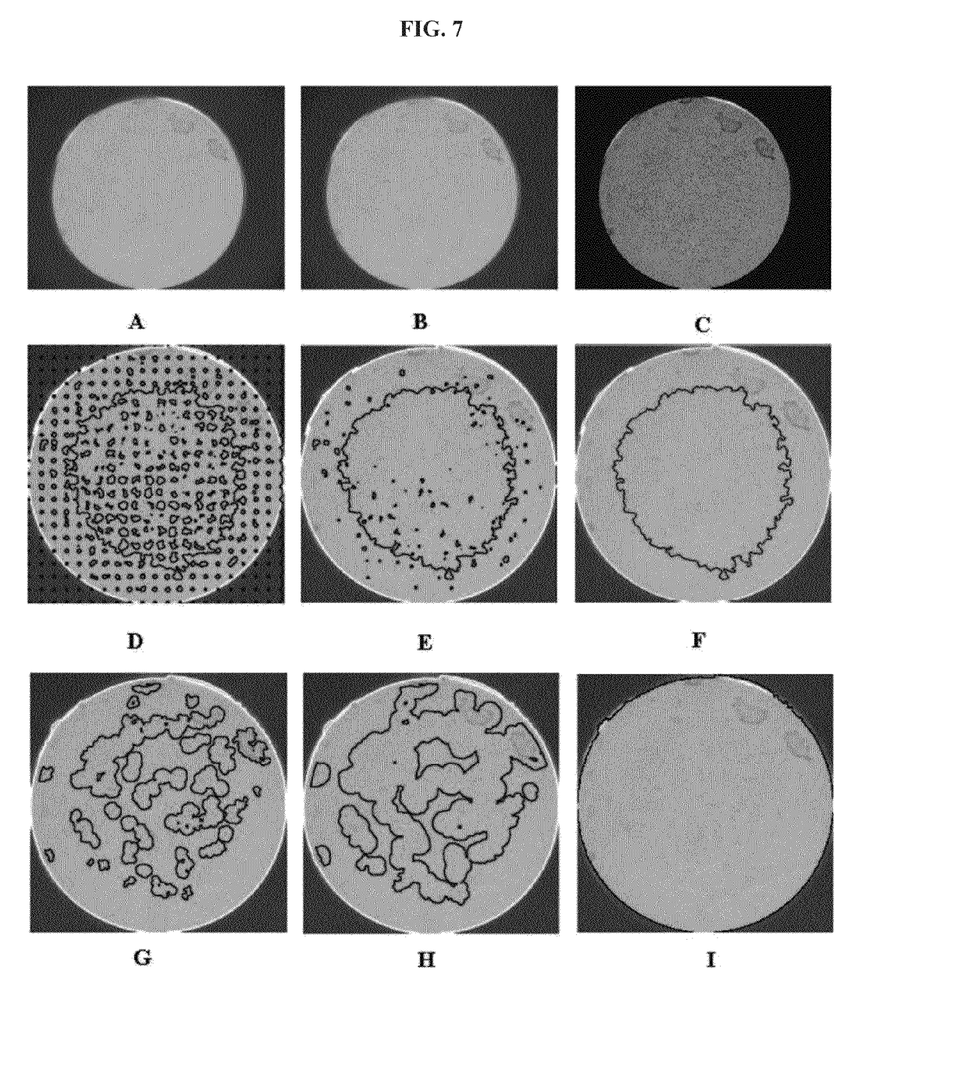
FIGS. 7(A-I): Comparing between the current scheme and the method of Asaad et al. (2007) in case of an input bladder cancer cell image corrupted with Gaussian noise with 100 noise variance.
Figure 8:
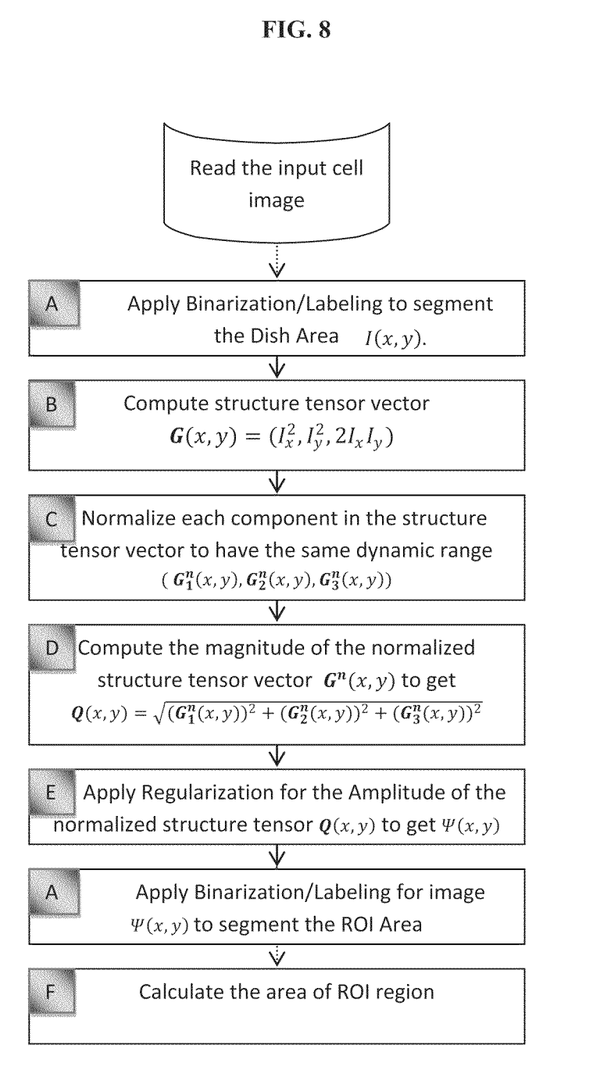
FIG. 8: Method #1: Fast Method comprising a structure tensor analysis based on the magnitude of the structure tensor vector and histogram-based thresholding.
Figure 9:
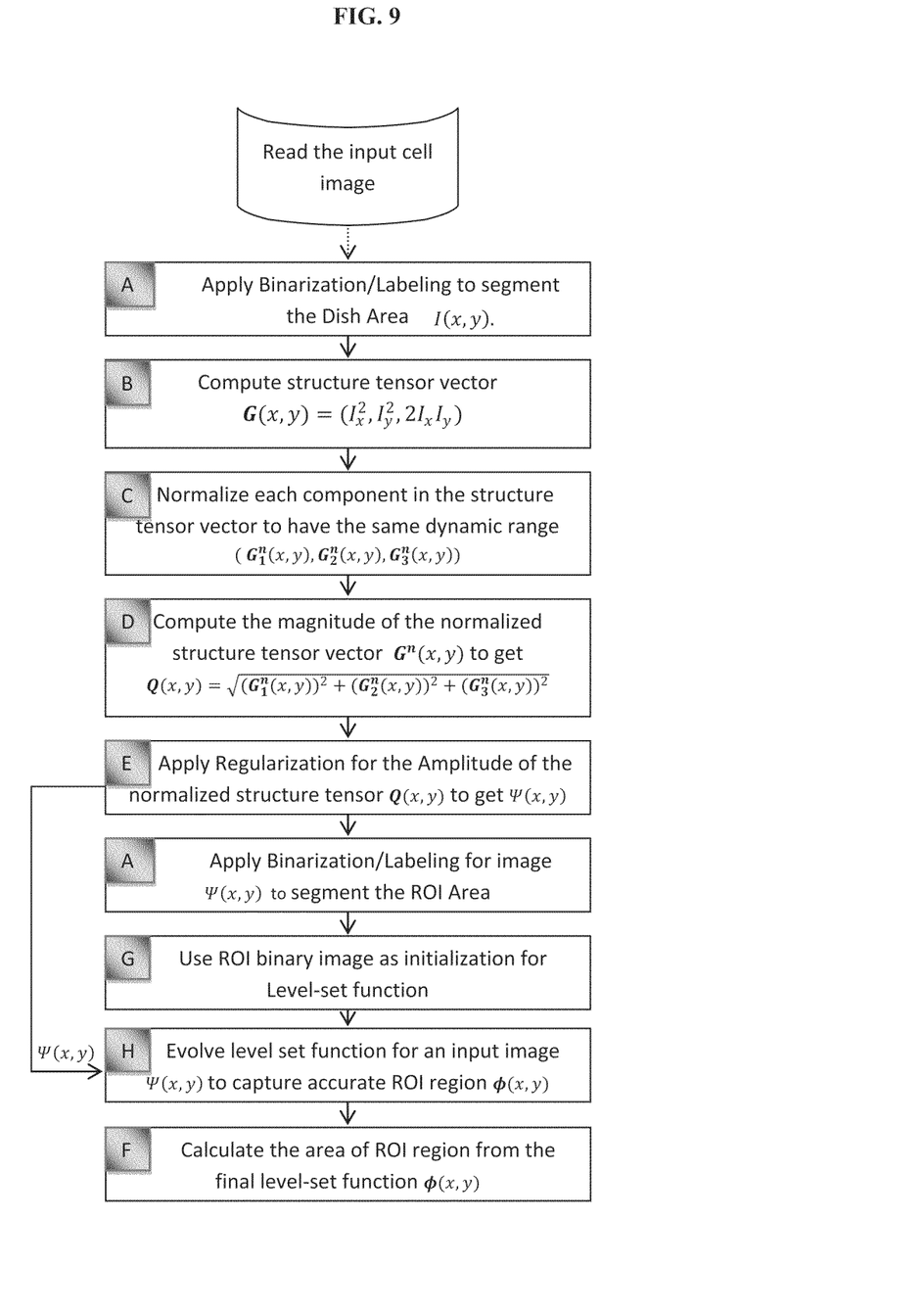
FIG. 9: Method #2: Accurate Method 1 comprising a structure tensor analysis based on the magnitude of the structure tensor vector, histogram-based thresholding, and statistical level-set segmentation using the magnitude component of the structure tensor vector.
Figure 10:
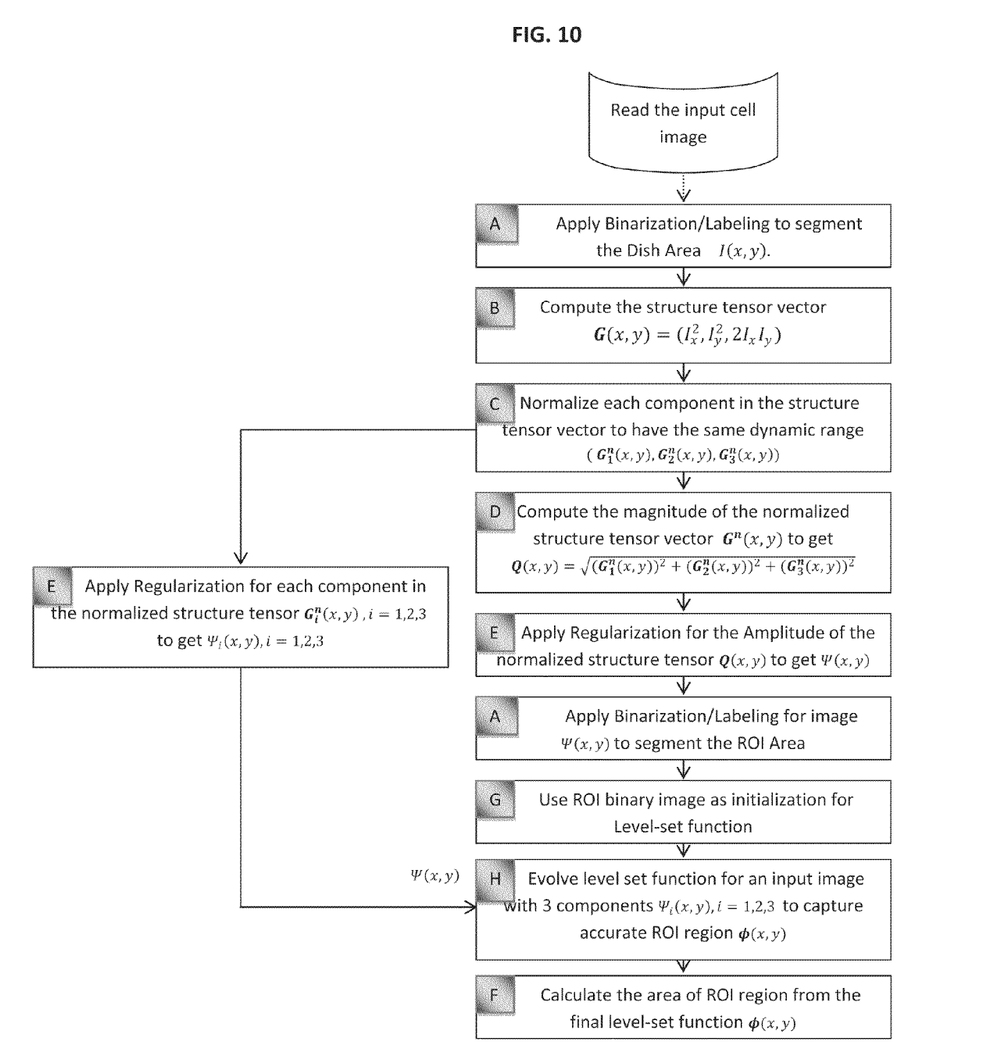
FIG. 10: Method #3: Accurate Method 2 comprising a structure tensor analysis, histogram-based thresholding, and statistical level-set segmentation using the three components of the structure tensor vector.
Figure 11:
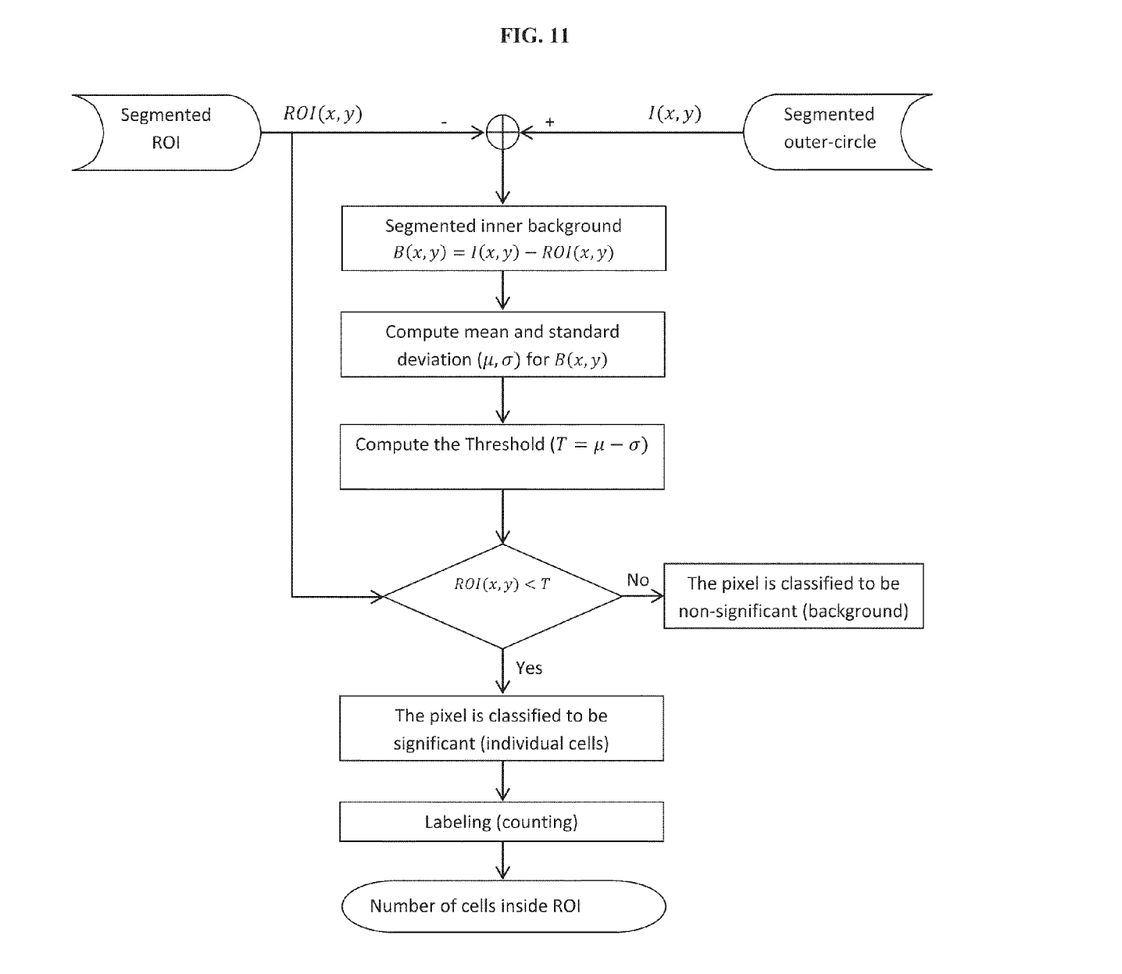
FIG. 11: Cell counting flowchart.

Another segmentation example is presented in FIG. 7 for a bladder cancer cell image that is corrupted by additive Gaussian noise with a variance equal to 100 (FIG. 7B). An enhanced version of the noisy input image (FIG. 7B) is shown in FIG. 7C. Intermediate and final segmentation results of the ROI are shown in FIGS. 7D-7F and FIGS. 7G-7I for the current scheme and the method of Asaad et al. (2007), respectively. FIG. 7F shows that, despite the high level of noise the current scheme is able to accurately segment the ROI. In contrast, as shown in FIGS. 7G-7I, the scheme of Asaad et al. (2007) was not able to detect the ROI.

Flowcharts illustrating some of the embodiments are given in FIGS. 8 to 11. A description of the blocks in the flowcharts follows.

Block A: Binarization using histogram-based thresholding. The histogram analysis comprises:

Computing the probability $p_i$ from the histogram of the input image I(x,y). where $p_i$ is the probability that the image intensity I=i, (i=0, 1, . . . , 255).

Starting from an initial, value for threshold T, computing the means and the updated threshold values $u_1$, $u_2$, and T, respectively, by using few iterations (around 4-6 iterations), $$u_1^{n+1} = \frac{\sum_{0 \leq j \leq T^n} j * p_j}{\sum_{0 < i < T^n} p_i}, u_2^{n+1} = \frac{\sum_{T^n < j \leq 255} j * p_j}{\sum_{T^n < i \leq 255} p_i},$$

and $$T^{n+1} = \frac{u_1^{n+1} + u_2^{n+1}}{2}$$

where n is the current iteration number, T is the threshold, which is used to segment between two regions with different mean values $u_1$ and $u_2$.

use the final Threshold to get a binary image
Apply labeling procedure to the binary image
Calculate the area for each labeled region
keep only the region which has large area and remove other regions.

Block B: This block is used to perform the structure tensor vector $\hat{G}$ for image I(x,y), which is represented by $G(x,y) = (I_x^2, I_y^2, 2I_xI_y)$ where $I_x$ and $I_y$ represents the derivatives of image I(x,y) in x and y directions, respectively.

Block C: This block is used to perform normalization to each component in the structure tensor vector $\hat{G}$ to have the same dynamic range (e.g., 0 to 1).

Block D: This block is used to perform the magnitude of the normalized structure tensor vector $\hat{G}^n(x,y)$ which is given by $$Q(x, y) = \sqrt{(G_1^n(x, y))^2 + (G_2^n(x, y))^2 + (G_3^n(x, y))^2}$$

Block E: This block is used to perform regularization for an input image to get a smoothed and a regularized version. this can be done by using anyone of the following methods
mathematical morphology using image closing operation.
undecimated wavelet transform.
nonlinear diffusion filter.

Block F: This block is used to calculate the area inside a region by counting the number of pixels inside this region.

Block G: This block is used to initialize the level-set function $\phi$ by using the binary image of the ROI area from previous step. the ROI binary image is converted to a distance function by keeping the region inside ROI with positive distance and keeping the region outside ROI with negative distance function.

Block H: This block is used to perform the statistical level set segmentation method to segment ROI using the information in each component of the output of the regularized image $\Psi_i(x,y)(i=1, 2, 3)$. The evolution function of the statistical level-set segmentation method using three component of $\Psi_i(x,y)$ is given by $$\frac{\partial \phi}{\partial t} = \delta(\phi) \left( v div \left( \frac{\nabla \phi}{|\nabla \phi|} \right) + \sum_{j=1}^{3} \log \frac{p_1(\Psi_j)}{p_2(\Psi_j)} \right)$$

All of the methods and apparatus disclosed and claimed herein can be made and executed without undue experimentation in light of the present disclosure. While the descriptions above contain many specifities, these should not be construed as limiting the scope of the embodiments but as merely providing illustrations of some of the presently preferred embodiments. It will be apparent to those of skill in the art that variations may be applied to the methods and apparatus and in the steps or in the sequence of steps of the method described herein without departing from the concept, spirit and scope of the appended claims. More specifically, it will be apparent that certain procedures may be substituted for the procedures described herein while achieving the same or similar results. All such similar substitutes and modifications apparent to those skilled in the art are deemed to be within the spirit, scope and concept defined by the appended claims.

The invention claimed is:

1. A method of detecting and segmenting clusters of cells in an image, comprising:
   inputting image data I at a plurality of location (x,y) values,
   generating a variation map V(x,y) by performing a structure tensor analysis for calculating variations for one or more I(x,y) values, corresponding to an amount of change of said I(x,y) values relative to values at neighboring locations, along one or more directions,
   performing a multiscale decomposition of the variation map V(x,y) resulting in subband images at each scale,
   smoothing the variation map V(x,y) by combining subband images, and
   segmenting the smoothed variation map.

2. The method of claim 1, wherein said structure tensor analysis comprises one or more of a structure tensor vector and a structure tensor vector amplitude.

3. The method of claim 1, wherein the step of smoothing comprises performing one or more of a morphological closing operation and a non-linear diffusion filtering.

4. The method of claim 1, wherein the step of performing a multiscale decomposition comprises performing a wavelet-based decomposition.

5. The method of claim 1, wherein the step of smoothing comprises performing a pointwise multiplication of two or more subband images across scales.

6. The method of claim 1, wherein the step of segmenting comprises one or more of binarizing and labeling.

7. The method of claim 6 wherein the step of binarizing further comprises performing a histogram-based thresholding.

8. The method of claim 1, wherein the step of segmenting comprises performing a level-set segmentation.

9. The method of claim 8 wherein said level-set segmentation comprises one or more of a one-function level-set segmentation and a statistical level-set segmentation.

10. The method of claim 8 wherein said level-set segmentation comprises one or more of a weighted level-set segmentation and a two-step level-set segmentation.

11. The method of claim 1, wherein the step of segmenting comprises a histogram-based thresholding.

12. The method of claim 1, further comprising the step of computing one or more areas of said clusters of cells.

13. The method of claim 1, further comprising the step of counting one or more cells in said clusters of cells.

14. An apparatus for detecting and segmenting clusters of cells in an image, comprising:
   a. an interface configured to receive image data I comprising a plurality of (x,y) values,
   b. a memory for storing, at least temporarily, at least a portion of said image data, and
   c. one or more processors in communication with said memory configured to generate a variation map V(x,y) by performing a structure tensor analysis for calculating variations for one or more of the stored I(x,y), perform a multiscale decomposition of the variation map V(x,y) resulting in subband images at every scale, smooth the variation map V(x,y) by combining subband images, and segment the smoothed variation map.

15. The apparatus of claim 14, wherein the one or more processors segment said smoothed variation map by performing a level-set based segmentation.

16. The apparatus of claim 14, wherein said structure tensor analysis comprises computing one or more of a structure tensor vector and a structure tensor vector amplitude.

17. The apparatus of claim 14, wherein the one or more processors perform one or more of determining areas of said clusters of cells and counting cells in said clusters of cells.

18. The apparatus of claim 14, wherein the one or more processors smooth said variation map by performing one or more of a morphological closing operation and a non-linear diffusion filtering.

19. The apparatus of claim 14, wherein the one or more processors perform a multiscale decomposition of said variation map by performing a wavelet-based decomposition.

20. The apparatus of claim 14, wherein the one or more processors smooth said variation map by performing a pointwise multiplication of two or more subband images across scales.

21. The apparatus of claim 14, wherein the one or more processors segment said smoothed variation map by performing one or more of a binarization and labeling.

22. The apparatus of claim 21, wherein said binarization comprises a histogram-based thresholding.

23. The apparatus of claim 14, wherein the one or more processors segment said smoothed variation map by performing a histogram-based thresholding.

* * * * *